(12) United States Patent
Courtright et al.

(10) Patent No.: US 9,545,873 B2
(45) Date of Patent: Jan. 17, 2017

(54) PICKUP TRUCK BOX REINFORCEMENT FOR FIFTH WHEEL PEDESTAL

(71) Applicant: Ford Global Technologies, LLC, Dearborn, MI (US)

(72) Inventors: Mark Joseph Courtright, Allen Park, MI (US); Joshua Hemphill, White Lake, MI (US); James Adam Drozdowski, Canton, MI (US); John Comiez, Novi, MI (US); Vincent Chimento, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 58 days.

(21) Appl. No.: 14/471,302

(22) Filed: Aug. 28, 2014

(65) Prior Publication Data

US 2016/0059766 A1   Mar. 3, 2016

(51) Int. Cl.
*B60P 7/08* (2006.01)
*B62D 53/08* (2006.01)
*B62D 25/20* (2006.01)
*B62D 33/027* (2006.01)
*B60D 1/06* (2006.01)
*B62D 33/02* (2006.01)

(52) U.S. Cl.
CPC .............. *B60P 7/0807* (2013.01); *B60D 1/06* (2013.01); *B62D 25/209* (2013.01); *B62D 25/2054* (2013.01); *B62D 33/0222* (2013.01); *B62D 33/0273* (2013.01); *B62D 53/0807* (2013.01)

(58) Field of Classification Search
CPC ........................................................ B60D 1/52
USPC ................... 280/425.2, 418.1, 476.1, 415.1, 417.1,280/495, 496, 491.5
See application file for complete search history.

(56) References Cited

U.S. PATENT DOCUMENTS

| | | | |
|---|---|---|---|
| 4,921,266 A * | 5/1990 | Beals | 280/415.1 |
| 6,565,109 B1 * | 5/2003 | Kloepfer | B62D 53/0842 280/433 |
| 6,805,379 B2 | 10/2004 | Nommensen | |
| 7,793,968 B1 * | 9/2010 | Withers | 280/496 |
| 2002/0101056 A1 * | 8/2002 | Fandrich | B62D 53/0828 280/491.5 |
| 2009/0295122 A1 * | 12/2009 | Withers | B62D 53/0828 280/476.1 |
| 2013/0113180 A1 * | 5/2013 | McCoy | B60D 1/52 280/418.1 |
| 2013/0300087 A1 | 11/2013 | Hausler et al. | |
| 2014/0015224 A1 * | 1/2014 | Leech | B62D 53/08 280/491.1 |

* cited by examiner

*Primary Examiner* — Jacob Knutson
(74) *Attorney, Agent, or Firm* — Jason C. Rogers; Brooks Kushman P.C.

(57) ABSTRACT

A reinforcement panel for the floor of a pick-up truck bed. The reinforcement panel is assembled between the floor of the pick-up truck and a fifth wheel cross member. The reinforcement panel includes transversely extending reinforcing or stiffening ribs. The stiffening ribs resist deflection in the area of the gooseneck ball receptacle.

7 Claims, 3 Drawing Sheets

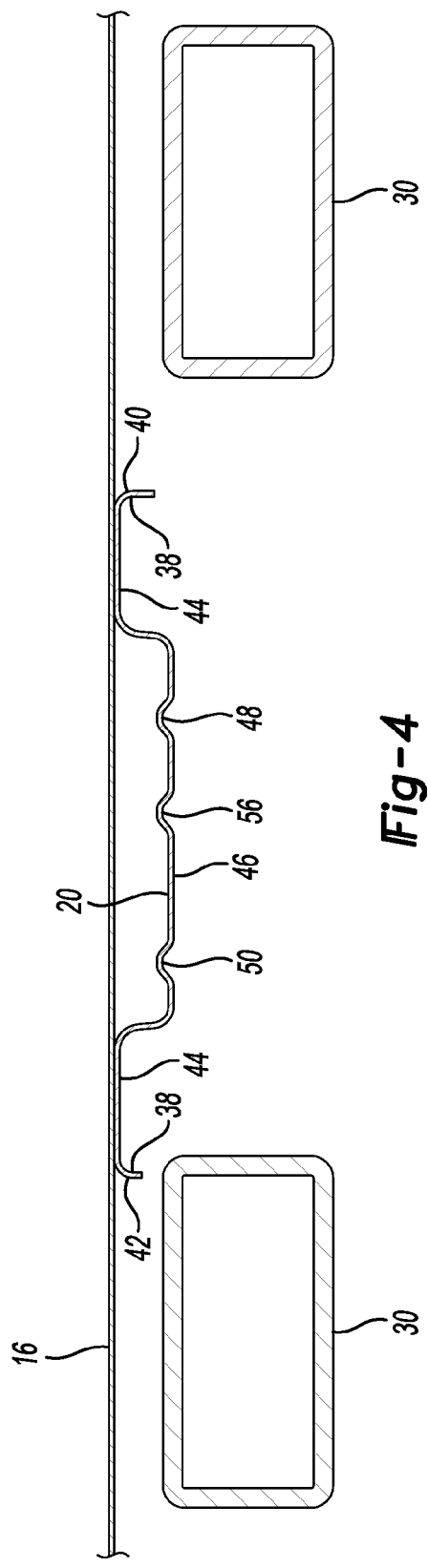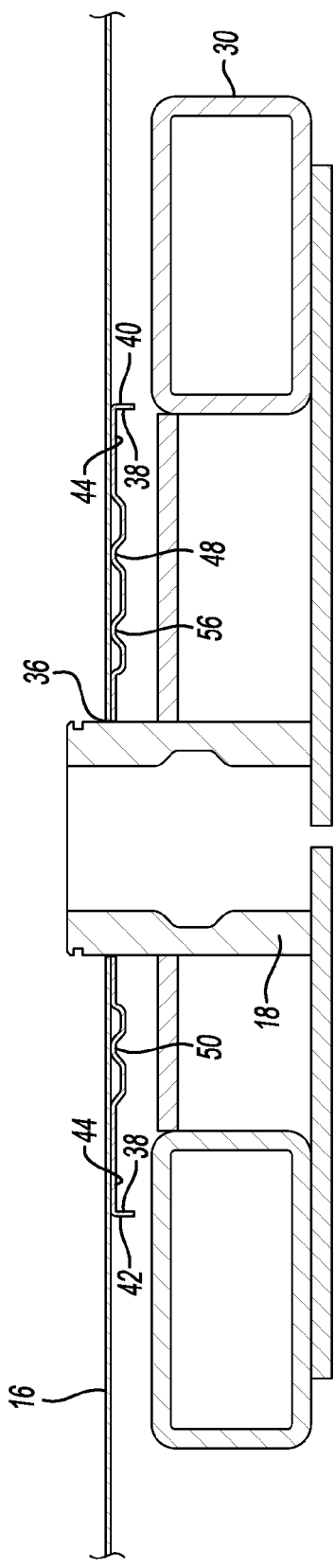

PICKUP TRUCK BOX REINFORCEMENT FOR FIFTH WHEEL PEDESTAL

TECHNICAL FIELD

This disclosure relates to reinforcement structures for the floor of a pickup truck box that is adapted to receive a fifth wheel pedestal or gooseneck ball.

BACKGROUND

Fifth wheel pedestals that include a gooseneck ball receptacle are available that are structurally supported by a fifth wheel cross member on the frame rails of the pickup truck below the truck bed. The floor of the pickup truck bed above the fifth wheel cross member is subject to an unacceptable amount of deflection in the center of the pickup truck box. Unacceptable deflection is characterized by "oil canning" when pressure is applied to the floor by placing a load on the floor or walking on the floor.

There is little clearance available between the lower side of the floor of the pickup truck bed and the fifth wheel cross member. Any reinforcement of the pickup truck floor above the fifth wheel cross member must have a limited height and is restricted in the longitudinal direction by the fifth wheel pedestal receptacles. A reinforcement must also be as light weight as possible to meet fuel economy goals.

This disclosure is directed to solving the above problems and other problems as summarized below.

SUMMARY

According to one aspect of this disclosure, a reinforcement is provided for a pickup truck bed floor. The reinforcement comprises a panel adapted to be attached to a lower surface of the floor that defines an opening for a gooseneck ball receptacle. The reinforcement includes a downwardly extending flange on the front edge and rear edge of the panel and a weld flange oriented to engage the lower surface. Outer portions of the panel are spaced to a greater extent from the lower surface and also include a plurality of transversely extending stiffening ribs.

According to another aspect of this disclosure, a pickup truck bed is disclosed that is adapted to receive a fifth wheel pedestal. The pickup truck bed includes a floor having longitudinally extending ribs. A fifth wheel cross member assembly is spaced from the floor and attached to a pair of frame rails that directly receive loads applied by the fifth wheel pedestal. A reinforcement panel having transversely extending ribs is attached to a lower surface of the floor above the reinforcement assembly and is raised in a central area to avoid contacting the fifth wheel cross member assembly near the gooseneck receptacle.

According to other aspects of this disclosure, the stiffening ribs may include a front rib and a rear rib that extend from a pair of right side fifth wheel pedestal receptacles to a pair of left side fifth wheel pedestal receptacles. The stiffening ribs may include a front pair of gooseneck anti-deflection ribs and a rear pair of gooseneck anti-deflection ribs that each extend from the front rib and rear rib to a transverse reinforcing rib at an angle perpendicular to a radial line extending from the center of the gooseneck receptacle. The stiffening ribs and the gooseneck anti-deflection ribs may have a height that is less than a space defined between the floor and a fifth wheel cross member.

The panel may have a central section that defines the gooseneck receptacle opening that is flanked by right and left sections that extend between a front fifth wheel pedestal receptacle and a rear fifth wheel pedestal receptacle, and wherein the central section is wider in the longitudinal direction than the right and left sections. The weld flanges may be parallel to the floor and extend continuously across the central section and the right and left sections.

The longitudinally extending ribs and the transversely extending ribs form a grid when the reinforcement panel is attached to the floor that resists deflection of the floor in the longitudinal and transverse directions.

The above aspects of this disclosure and other aspects are described in greater detail below with reference to the attached drawings.

BRIEF DESCRIPTION OF THE DRAWINGS

FIG. 4 is a cross-section taken along the line 4-4 in FIG. 3; and

FIG. 5 is a cross-section taken along the line 5-5 in FIG. 3.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
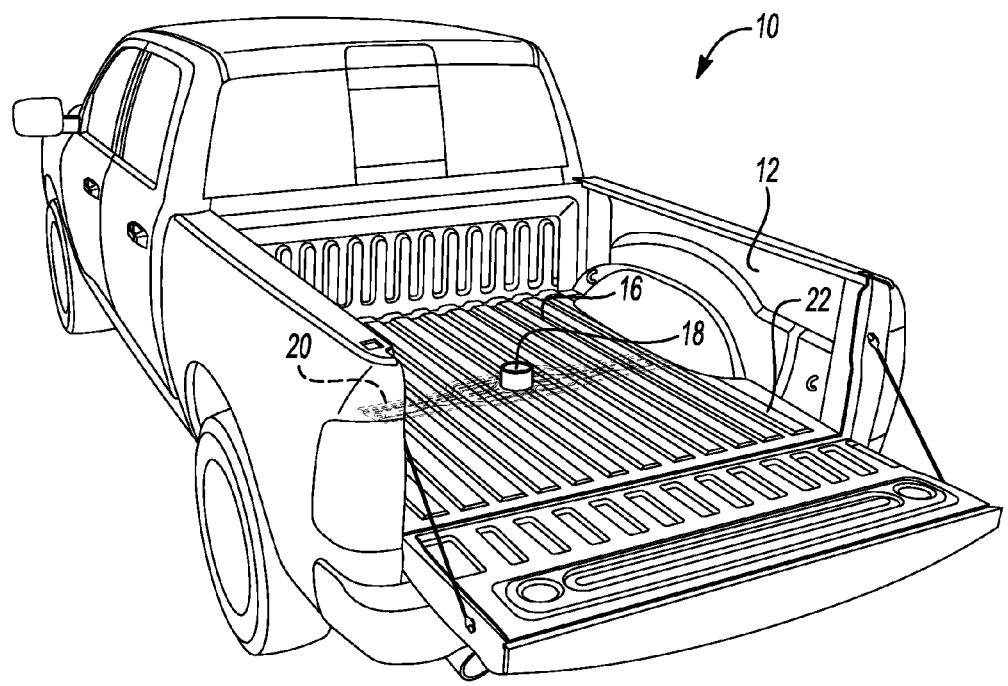
FIG. 1 is a left side/rear perspective view of a pickup truck.

Referring to FIG. 1, a pick-up truck 10 is shown from the rear left side to provide a view of a truck bed 12. The truck bed 12 includes a floor 16. A gooseneck ball receptacle 18 is shown extending through the floor 16. A reinforcement panel 20 is shown in phantom lines as it is attached to the bottom of the floor 16. The floor 16 includes longitudinally extending ribs 22. The longitudinally extending ribs 22 resist deflection in the floor 16 in the fore-and-aft direction.

Figure 2:
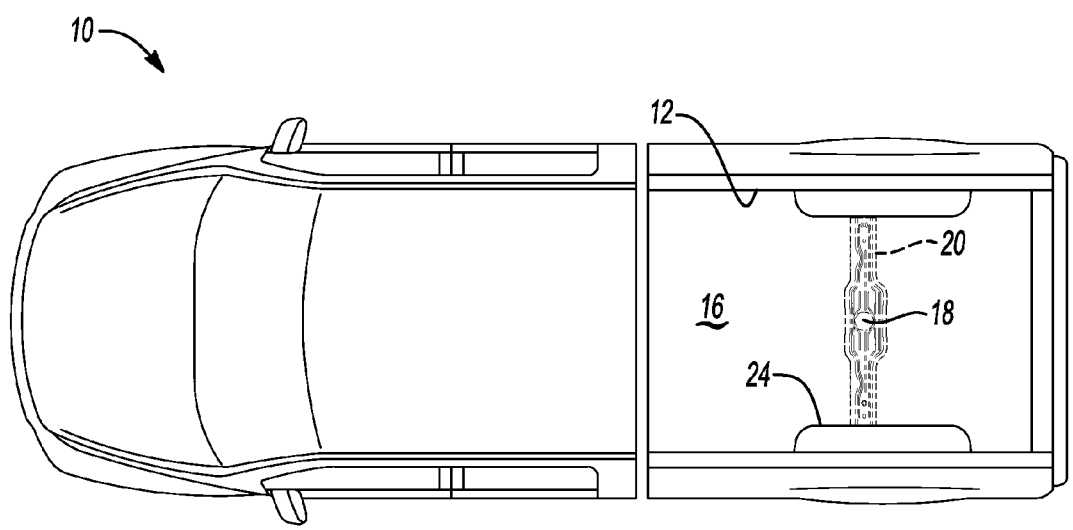
FIG. 2 is a top plan view of a pickup truck with a pickup truck floor reinforcement panel.

Referring to FIG. 2, the pick-up truck 10 is shown in a top plan view showing the pick-up truck bed 12. The floor 16 is shown without the longitudinally extending ribs 22, shown in FIG. 1. The reinforcement panel 20 secured to the bottom of the floor 16 extends between the wheel housings 24. The gooseneck ball receptacle 18 is shown centered relative to the reinforcement panel 20 and the wheel housings 24.

Figure 3:
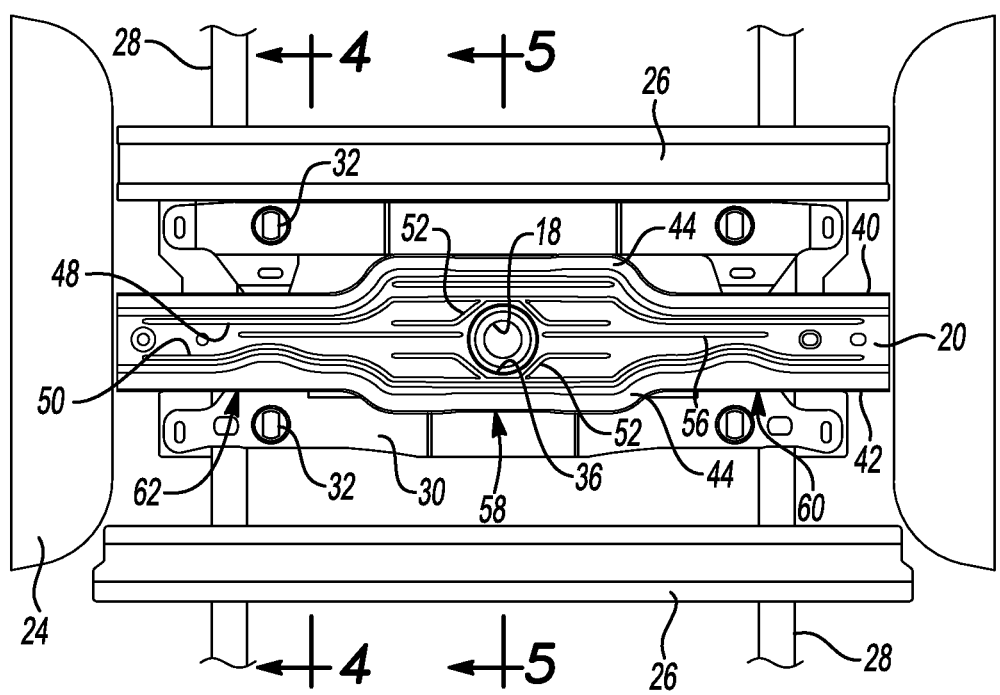
FIG. 3 is a top plan view of a pickup truck floor reinforcement and fifth wheel cross member between the wheel wells.

Referring to FIGS. 3-5, the reinforcement panel 20 and gooseneck ball receptacle 18 are shown with the floor removed in FIG. 3. The reinforcement panel 20 extends between the wheel housings 24. Transverse beams 26 are attached to frame rails 28 that extend in a longitudinal direction relative to the vehicle. The transverse beams 26 extend in a transverse direction and are provided in front of and in back of a fifth wheel cross member 30. The fifth wheel cross member 30 supports the truck bed 12 (shown in FIGS. 1 and 2) and is adapted to receive a fifth wheel pedestal (not shown) on fifth wheel pedestal receptacles 32. The fifth wheel pedestal receptacles 32 receive the legs of the fifth wheel pedestal. Loads applied to the fifth wheel pedestal are transferred directly through the fifth wheel pedestal receptacles 32 and the fifth wheel cross member 30 to the frame rails 28. The fifth wheel cross member 30 also includes an opening 36 for receiving the gooseneck ball receptacle 18.

Referring specifically to FIG. 4, the reinforcement panel 20 includes downwardly extending flanges 38 on a front edge 40 and a rear edge 42 of the reinforcement panel 20. Weld flanges 44 are provided adjacent the downwardly extending flanges 38. A lower portion 46 of the reinforcement panel 20 is spaced from the floor 16 to make the section deeper and stronger than the lower portion of the panel around the gooseneck ball receptacle 18. The lower portion 46 includes a front stiffening rib 48 and a rear stiffening rib 50. A transverse stiffening rib 56 is formed between the front stiffening rib 48 and the rear stiffening rib 50.

Referring to FIG. 3, four gooseneck anti-deflection stiffening ribs 52 are provided that extend from the front stiffening rib 48 and rear stiffening rib 50. The gooseneck anti-deflection stiffening ribs 52, as illustrated, extend at an approximately 45° angle relative to the front and rear stiffening ribs 48 and 50. The angular orientation of the gooseneck anti-deflection stiffening ribs 52 may vary from 45°, but are preferably oriented perpendicular to a radial line extending from the center of the gooseneck ball receptacle 18. A plurality of the transverse reinforcing ribs 56 are provided between the front stiffening rib 48 and rear stiffening rib 50 to provide additional transverse stiffness for the reinforcement panel 20 and, in turn, for the floor 16 (shown in FIG. 1).

Referring to FIGS. 3 and 5, the cross section taken through the gooseneck ball receptacle 18 in a central section 58 to illustrate the relationship between the floor 16, reinforcement panel 20 and fifth wheel cross member 30. The fifth wheel cross member 30 is closely spaced to the floor 16 in the central section 58 that defines the gooseneck ball opening 36. The close spacing in the central section 58 limits the height of the reinforcement panel 20 and minimize the possibility of contact with the fifth wheel cross member 30. The spacing between the reinforcement panel 20 and the fifth wheel cross-member 30 is the minimum spacing to prevent contact during vehicle operation. At the center of the reinforcement panel 20, downwardly extending flanges 38 are provided on the front edge 40 and rear edge 42. The weld flanges 44 are disposed between the downwardly extending flanges 38 and the front stiffening rib 48 and rear stiffening rib 50, respectively.

Referring to FIGS. 3-5, the reinforcement panel 20 is shown to include the central section 58, a right section 60 and a left section 62. The central section 58 has a greater width centered in the longitudinal direction than the right section 60 and left section 62. The right and left sections 60 and 62 are of reduced width to accommodate the structure of the fifth wheel pedestal receptacles 32 that are provided in front of and in back of the reinforcement panel 20. As shown in FIG. 4, the right section 60 and left section 62 include the beads 48, 50 and 56 that are spaced to a greater extent from the floor 16. As shown in FIG. 5, the central section 58 is closer to the floor 16 and the beads 48, 50 and 56 are shown to be in contact with the floor 16.

The weld flanges may be spot welded to the floor 16. The longitudinally extending ribs 22 in the floor 16 (shown in FIG. 1) in combination with the stiffening ribs 48 and 50 and transverse reinforcement rib 56 provide a perpendicular grid pattern of stiffening elements that resist deflection in the area corresponding to the location of the fifth wheel cross member 30.

The embodiments described above are specific examples that do not describe all possible forms of this disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A reinforcement welded to a pick-up bed floor comprising:
   a panel having a central section defining an opening for receiving a gooseneck receptacle, a right section and a left section, the panel including a plurality of transversely extending stiffening ribs spaced from the floor in the right and left sections, and contacting the floor in the central section, the reinforcement disposed above a fifth wheel cross-member that receives a pedestal on pedestal receptacles.

2. The reinforcement of claim 1 wherein the stiffening ribs include a front rib and a rear rib that extend from a pair of right side fifth wheel pedestal receptacles of the pedestal receptacles for the pedestal to a pair of left side fifth wheel pedestal receptacles of the pedestal receptacles for the pedestal.

3. The reinforcement of claim 2 wherein the stiffening ribs include a front pair of gooseneck anti-deflection ribs and a rear pair of gooseneck anti-deflection ribs that each extend from the front rib and the rear rib to a transverse reinforcing rib at an angle perpendicular to a radial line extending from a center of the gooseneck receptacle.

4. The reinforcement of claim 3 wherein the stiffening ribs and the gooseneck anti-deflection ribs have a height that is less than a space defined between the floor and the fifth wheel cross-member.

5. The reinforcement of claim 1 wherein the central section is flanked by the right and left sections that extend between a front fifth wheel pedestal receptacle and a rear fifth wheel pedestal receptacle of the pedestal receptacles for the pedestal, and wherein the central section is wider in a longitudinal direction than the right and left sections of the fifth wheel pedestal receptacles.

6. The reinforcement of claim 5 wherein a weld flange is disposed parallel to the floor and extends continuously and laterally across the central section and the right and left sections.

7. The reinforcement of claim 1 wherein the reinforcement is formed of an aluminum alloy.

* * * * *